United States Patent
Goel et al.

(10) Patent No.: US 9,965,521 B1
(45) Date of Patent: May 8, 2018

(54) DETERMINING A TRANSITION PROBABILITY FROM ONE OR MORE PAST ACTIVITY INDICATIONS TO ONE OR MORE SUBSEQUENT ACTIVITY INDICATIONS

(71) Applicant: Google Inc., Mountain View, CA (US)

(72) Inventors: Gagan Goel, New York, NY (US); Pushkar Tripathi, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 242 days.

(21) Appl. No.: 14/173,738

(22) Filed: Feb. 5, 2014

(51) Int. Cl.
*G06F 17/30* (2006.01)

(52) U.S. Cl.
CPC .... *G06F 17/3053* (2013.01); *G06F 17/30011* (2013.01)

(58) Field of Classification Search
CPC .............. G06F 17/18; G06F 17/2818; G06F 17/30687; G06F 17/3053; G06F 17/30011
USPC ................. 707/723, 728, 748, 771, 999.003
See application file for complete search history.

(56) References Cited

U.S. PATENT DOCUMENTS

| | | | |
|---|---|---|---|
| 6,195,622 B1* | 2/2001 | Altschuler | G06F 17/30902 703/2 |
| 6,272,507 B1* | 8/2001 | Pirolli | G06F 17/30011 707/999.005 |
| 7,877,385 B2 | 1/2011 | Craswell et al. | |
| 8,204,897 B1* | 6/2012 | Djabarov | G06F 17/30705 707/767 |
| 8,244,737 B2 | 8/2012 | Liu et al. | |
| 8,407,229 B2* | 3/2013 | Yang | G06F 17/30864 707/748 |
| 8,515,975 B1* | 8/2013 | Federici | G06F 17/30 707/750 |
| 8,706,721 B1* | 4/2014 | Eaves | G06F 17/30867 707/727 |
| 2007/0112768 A1* | 5/2007 | Majumder | G06F 17/30864 |
| 2008/0313171 A1* | 12/2008 | Galvin | G06F 17/30864 |
| 2009/0076995 A1* | 3/2009 | Uyama | G06Q 30/02 706/46 |
| 2009/0083222 A1* | 3/2009 | Craswell | G06F 17/30864 |
| 2009/0287680 A1* | 11/2009 | Paek | G06F 17/3064 |
| 2010/0082605 A1 | 4/2010 | Dupret et al. | |
| 2010/0131902 A1* | 5/2010 | Teran | G06F 17/30973 715/843 |
| 2010/0153324 A1* | 6/2010 | Downs | G06F 17/2745 706/21 |
| 2010/0250529 A1* | 9/2010 | Surendran | G06Q 30/02 707/732 |
| 2010/0268725 A1* | 10/2010 | Wang | G06F 17/2735 707/765 |

(Continued)

*Primary Examiner* — Mohammed R Uddin
(74) *Attorney, Agent, or Firm* — Middleton Reutlinger

(57) ABSTRACT

Methods and apparatus related to determining a transition probability related to transition from one or more past activity indications to one or more subsequent activity indications. Some implementations of the specification are directed to methods and apparatus related to identifying a set of one or more activity indications of a user, identifying at least first and second transition probabilities from the set to a subsequent set of one or more activity indications, and determining a user transition probability from the set to the subsequent set based on the first and second transition probabilities.

23 Claims, 8 Drawing Sheets

(56) References Cited

U.S. PATENT DOCUMENTS

| | | | |
|---|---|---|---|
| 2011/0047161 A1* | 2/2011 | Myaeng | G06F 17/30672 707/740 |
| 2011/0137831 A1* | 6/2011 | Ide | G06K 9/6297 706/12 |
| 2011/0208730 A1* | 8/2011 | Jiang | G06F 17/30864 707/727 |
| 2011/0276523 A1* | 11/2011 | Brdiczka | G06F 17/3061 706/12 |
| 2011/0288868 A1* | 11/2011 | Lloyd | H04M 1/271 704/251 |
| 2011/0289063 A1 | 11/2011 | Radlinski et al. | |
| 2011/0295840 A1* | 12/2011 | Ciaramita | G06F 17/30442 707/719 |
| 2012/0246684 A1* | 9/2012 | Yarvis | G06Q 30/02 725/60 |
| 2012/0265760 A1* | 10/2012 | Yan | G06F 17/30864 707/740 |
| 2012/0269116 A1* | 10/2012 | Xing | H04L 67/22 370/328 |
| 2013/0159291 A1* | 6/2013 | Ieong | G06Q 30/02 707/723 |
| 2013/0173568 A1* | 7/2013 | Josifovski | G06F 17/30864 707/706 |
| 2014/0075385 A1* | 3/2014 | Wan | G06Q 10/1093 715/812 |
| 2014/0172899 A1* | 6/2014 | Hakkani-Tur | G06F 17/30522 707/759 |
| 2014/0365504 A1* | 12/2014 | Franceschini | G06F 17/30958 707/748 |
| 2015/0032767 A1* | 1/2015 | Gao | G06F 17/30864 707/765 |

* cited by examiner

| Sets of Activity Indications | Sets of Features |
|---|---|
| <D1, D2, D3, Q1, Q2><br>122A | <152A, 152B, 152C, 162B, 162A><br>123A |
| <D10, Q1, Q3><br>122B | <152A, 162B, 162A><br>123B |
| <D1, D2, D3, Q2><br>122C | <152A, 152B, 152C, 162A><br>123C |
| <D2, D1, D3, Q2><br>122D | <152B, 152A, 152C, 162A><br>123D |
| <D3, D1, D2, Q2><br>122E | <152C, 152A, 152B, 162A><br>123E |
| <Q10, D10, D5><br>122F | <162B, 152C, 152C><br>123F |
| <Q2, D6, D10, D1><br>122G | <162A, 152A, 152A, 152A><br>123G |

DETERMINING A TRANSITION PROBABILITY FROM ONE OR MORE PAST ACTIVITY INDICATIONS TO ONE OR MORE SUBSEQUENT ACTIVITY INDICATIONS

Background

Users often visit one or more documents and/or issue one or more queries that are all generally related to one another. For example, a user may view one or more documents that all pertain to a certain topic. Based on viewing of the documents, the user may wish to locate additional information related to an aspect of the topic, and formulate a query that is directed toward that aspect of the topic. Also, for example, a user may issue a first query to obtain general information about a subject and visit one or more search result documents to obtain additional information about the subject. Based on the additional information, the user may formulate a second query that is directed to a narrower aspect of the subject, then issue the second query.

Summary

This specification is directed to methods and apparatus related to determining a transition probability related to transition from one or more past activity indications to one or more subsequent activity indications. The past activity indications and the subsequent activity indications are each indicative of one or more queries and/or one or more documents. For example, a past activity indication may include one or more identifiers indicative of one or more past documents interacted with such as, for example, uniform resource locators (URLs) or other identifier of the documents, one or more topics associated with the documents, one or more entities associated with the documents, and/or one or more task features associated with the documents. Also, for example, a subsequent activity indication may include one or more identifiers indicative of one or more queries such as one or more terms of the queries, one or more entities associated with the queries, and/or one or more task features associated with the queries. A given activity indication may be indicative of a single document, a single query, and/or may be indicative of multiple documents and/or queries.

Some implementations of the specification are directed to methods and apparatus related to identifying a set of one or more activity indications of a user, identifying at least first and second transition probabilities from the set to a subsequent set of one or more activity indications, and determining a user transition probability from the set to the subsequent set based on the first and second transition probabilities. The user transition probability may be utilized to select information to provide to the user and/or rank information provided to the user, wherein the information is related to the subsequent set of activity indications. For example, the user transition probability may be utilized to select a query to provide to the user and/or rank a query provided to the user, wherein the query is related to the subsequent set of activity indications.

Some implementations of the specification are directed to methods and apparatus related to identifying activity indications of multiple users, determining a preceding group of the activity indications, determining a subsequent group of the activity indications (that are each associated with and occur subsequent to one or more activity indications of the preceding group), and determining a transition probability from the preceding group to the subsequent group. The transition probability may be utilized to identify a transition probability from a set of activity indications related to the preceding group to a subsequent set of activity indications related to the subsequent group. For example, the transition probability may be utilized to determine, for a user, a user transition probability from a set of activity indications indicative of one or more documents related to the preceding group to a subsequent set of activity indications indicative of one or more queries related to the subsequent group.

In some implementations, a method is provided and includes the steps of: identifying a set of document indications of a user, the identified set of document indications indicative of multiple documents interacted with by the user; identifying, from a database of transition probabilities, a first transition probability from the set of document indications to a subsequent set of activity indications and a second transition probability from the set of document indications to the subsequent set, the subsequent set indicative of at least one of: at least one subsequent query or at least one subsequent document; and determining a user transition probability from the set of document indications to the subsequent set, the determining the user transition probability based on the first transition probability and based on the second transition probability.

This method and other implementations of technology disclosed herein may each optionally include one or more of the following features.

The method may further include: identifying at least a first attribute associated with the user and a second attribute associated with the user; wherein the first transition probability is associated with, and identified based on, the first attribute; and wherein the second transition probability is associated with, and identified based on, the second attribute. In some of those implementations, the method may further include: identifying a first weight of the first attribute for the user and a second weight of the second attribute for the user; and wherein determining the user transition probability may be based on the first weight and based on the second weight. Determining the user transition probability may include weighting the first transition probability based on the first weight and weighting the second transition probability based on the second weight.

The set of document indications may identify a first document of the documents indicated as interacted with by the user, and identifying the first transition probability may include: determining a document features set of the document and identifying the first transition probability based on a directed association from the document features set to the subsequent set. The set of document indications may identify a second document of the documents indicated as interacted with by the user subsequent to the first document, and identifying the second transition probability may include: determining a second document features set of the second document and identifying the second transition probability based on a second directed association from the second document features set to the subsequent set.

The set of document indications may identify a first document features set indicative of a first document of the documents interacted with by the user and a second document features set indicative of a second document of the documents interacted with by the user, wherein the first transition probability may be identified based on the first document features set and the second transition probability may be identified based on the second document features set.

The method may further include ranking the at least one subsequent query or the at least one subsequent document based on the user transition probability.

The subsequent set may be indicative of a given document of the at least one subsequent document, and the method may further include: identifying the given document as responsive to a new query submitted by the user; and ranking the given document for the new query based on the user transition probability.

The subsequent set may be indicative of a given query of the at least one subsequent query and the method may further include: selecting the given query for presentation to the user based on the user transition probability. Selecting the given query for presentation to the user based on the user transition probability may include selecting the given query independent of partial query input from the user and independent of complete query input from the user.

The method may further include: selecting information related to the subsequent set, the selecting based on the user transition probability; and providing the user with the information after the user has interacted with an additional document or issued an additional query, the additional document and the additional query independent of the documents indicated by the set of document indications of the user.

In some implementations, a method is provided that includes the steps of: identifying, from one or more databases, activity indications of a plurality of users, each of the identified activity indications identifying at least one submitted query or at least one interacted with document and including at least one directed association to one or more other of the identified activity indications; determining a preceding group of the activity indications, the determining the preceding group based on similarity between the activity indications of the preceding group; determining a subsequent group of the activity indications, the determining the subsequent group based on similarity between the activity indications of the subsequent group; wherein each of the activity indications of the subsequent group is indicated by a respective said directed association as associated with and occurring subsequent to one or more of the activity indications of the preceding group; and determining a transition probability from the preceding group to the subsequent group.

This method and other implementations of technology disclosed herein may each optionally include one or more of the following features.

The determining the preceding group based on similarity between the activity indications of the preceding group may include selecting only the activity indications that identify a document for the preceding group; and wherein the determining the subsequent group based on similarity between the activity indications of the subsequent group may include selecting only the activity indications that identify a query for the subsequent group.

The determining the subsequent group may include selecting one or more indirect activity indications for inclusion in the activity indications of the subsequent group, wherein a given indirect activity indication of the indirect activity indications may be indicated by a respective said directed association as associated with and occurring subsequent to one of the activity indications of the preceding group and associated with and occurring subsequent to one or more intervening activity indications that are not members of the preceding group.

Multiple documents may be identified by the activity indications of the preceding group and multiple queries may be identified by the activity indications of the subsequent group. In some of those implementations, the determining the subsequent group based on similarity between the activity indications of the subsequent group may include determining the activity indications of the subsequent group are each associated with one or more shared query features. In some of those implementations, the determining the preceding group based on similarity between the activity indications of the preceding group may include determining the activity indications of the preceding group are each associated with one or more shared document features. In some of those implementations, the method may further include associating the transition probability with transition from a shared document features set indicating the shared document features to a shared query features set indicating the shared query features. The shared document features may include a document topic. The shared document features may include at least one of a task, task type, and task step.

Determining the transition probability may be based on a count of the activity indications in at least one of the preceding group and the subsequent group.

Determining the transition probability may be based on comparing a count of the activity indications in the subsequent group to a second count of the activity indications of a larger corpus, wherein the larger corpus includes a second subsequent group of the activity indications, wherein each of the activity indications of the second subsequent group is excluded from the subsequent group. The larger corpus may be restricted to the second subsequent group, or include the second subsequent group and the subsequent group.

Determining the preceding group based on similarity between the activity indications of the preceding group may include selecting only the activity indications associated with a first user attribute for the preceding group; and the determining the subsequent group based on similarity between the activity indications of the subsequent group may include selecting only the activity indications associated with the first user attribute for the subsequent group. The method may further include associating the transition probability with the first user attribute.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
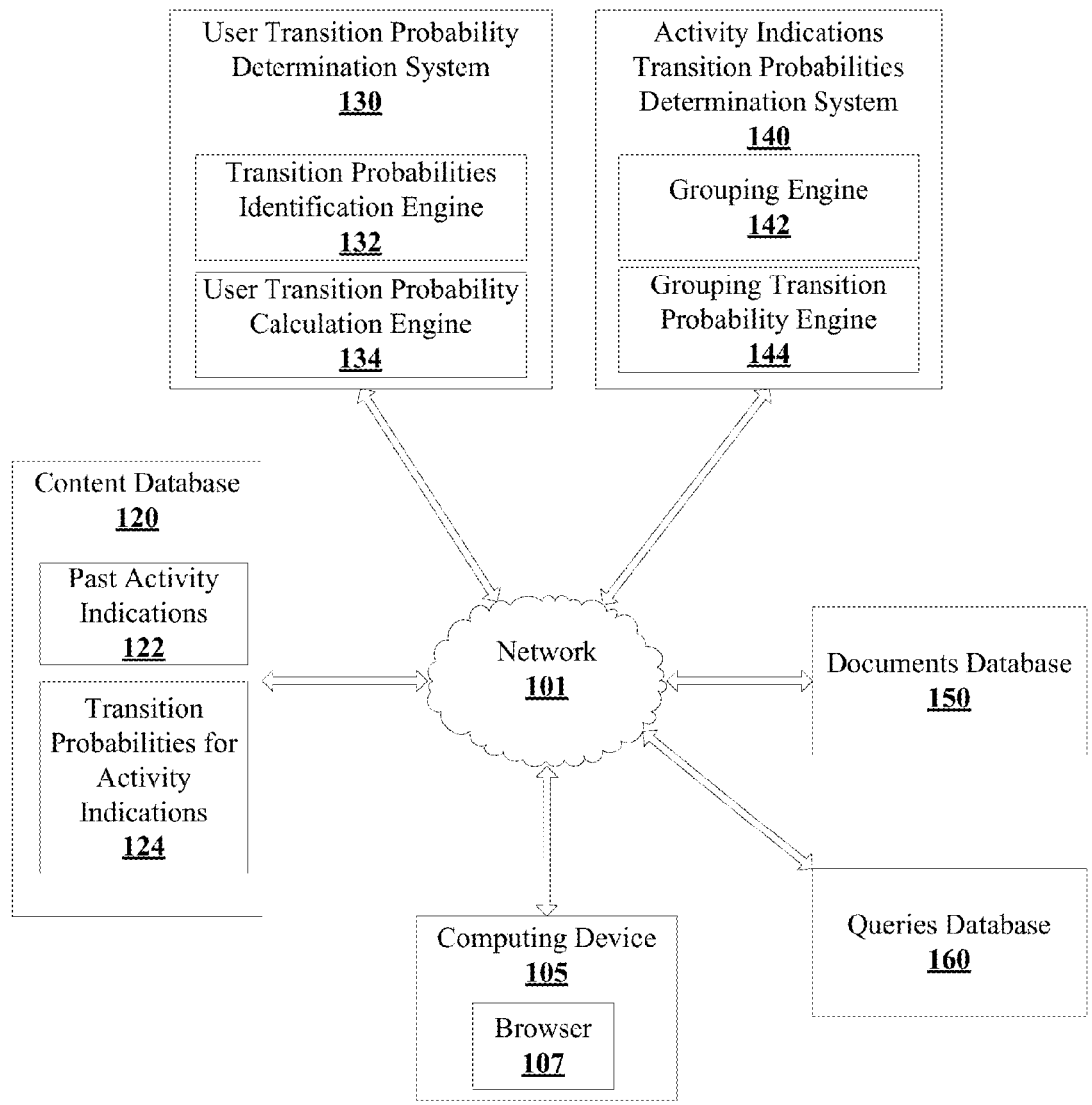
FIG. 1 is a block diagram of an example environment in which a transition probability related to transition from one or more past activity indications to one or more subsequent activity indications may be determined.

Techniques described herein may be utilized to determine a transition probability related to transition from one or more past activity indications to one or more subsequent activity indications. The past activity indications and the subsequent activity indications are each indicative of one or more queries and/or one or more documents.

Some implementations of the specification are directed to methods and apparatus related to identifying a set of one or more activity indications of a user, identifying at least first and second transition probabilities from the set to a subsequent set of one or more activity indications, and determining a user transition probability from the set to the subsequent set based on the first and second transition probabilities. The user transition probability may be utilized to select information to provide to the user and/or rank information provided to the user, wherein the information is related to the subsequent set of activity indications.

As one example, a set of activity indications may indicate a first document visited by a user and a second document visited by a user. A first transition probability from one or more document features of the first document to a subsequent query indication (e.g., a particular query and/or one or more query features) may be identified. A second transition probability from one or more document features of the second document to the subsequent query indication may also be identified. A user transition probability may be determined based on the first transition probability, the second transition probability, and optionally one or more additional factors (e.g., additional transition probabilities).

As described herein, in some implementations an identified transition probability from a first activity indication to a second activity indication may be based at least in part on past activity indications of users indicating indirect links from the first activity indication to the second activity indication. Stated otherwise, the identified transition probability may be based on activity indications of users that indicate the first activity indication, followed by one or more intervening activity indications, that are then followed by the second activity indication. Accordingly, in those implementations the identified transition probability may take into account non-direct links between the first activity indication and the second activity indication.

Some implementations of the specification are directed to methods and apparatus related to identifying activity indications of multiple users, determining a preceding group of the activity indications, determining a subsequent group of the activity indications that are associated with, and occur subsequent to, one or more activity indications of the preceding group, and determining a transition probability from the preceding group to the subsequent group. The transition probability may be utilized to identify a transition probability from a set of activity indications related to the preceding group to a subsequent set of activity indications related to the subsequent group.

As one example, a preceding group of the activity indications may include all document indications associated with a first user group and associated with a set of document features (e.g., a topic). The subsequent group of the activity indications may include all query indications associated with the first user group and associated with a set of query features (e.g., key terms and/or entities). The subsequent group may all be activity indications that are indicated as occurring subsequent to one or more activity indications of the preceding group (optionally with one or more intervening activity indications). A transition probability may be determined from the preceding group utilizing, for example, a count of occurrences of the activity indications in the preceding group and/or the subsequent group (e.g., frequency over a larger corpus and/or a time frame) and/or other statistical techniques.

As described herein, in some implementations the subsequent group may include one or more activity indications that have an indirect link to a respective past activity indication of the preceding group. For example, a subsequent activity indication of the subsequent group may be linked to a respective past activity indication of the preceding group via one or more intervening activity indications that occur between the past activity indication and the subsequent activity indication. Activity indications with indirect links may be determined, for example, based on a record of documents interacted with and/or submitted queries with timestamps or other temporal information. The record may be based on, for example, information provided by computing devices of users, with permission of the users.

Referring to FIG. 1, a block diagram of an example environment is provided in which a transition probability related to transition from one or more past activity indications to one or more subsequent activity indications may be determined. The environment includes a computing device 105 of a user, a content database 120, a user transition probability determination system 130, an activity indications transition probabilities determination system 140, a documents database 150, and a queries database 160. The environment also includes a communication network 101 that enables communication between various components of the environment. In some implementations the communication network 101 may include the Internet, one or more intranets, and/or one or more bus subsystems. The communication network 101 may optionally utilize one or more standard communications technologies, protocols, and/or inter-process communication techniques.

Figure 11:
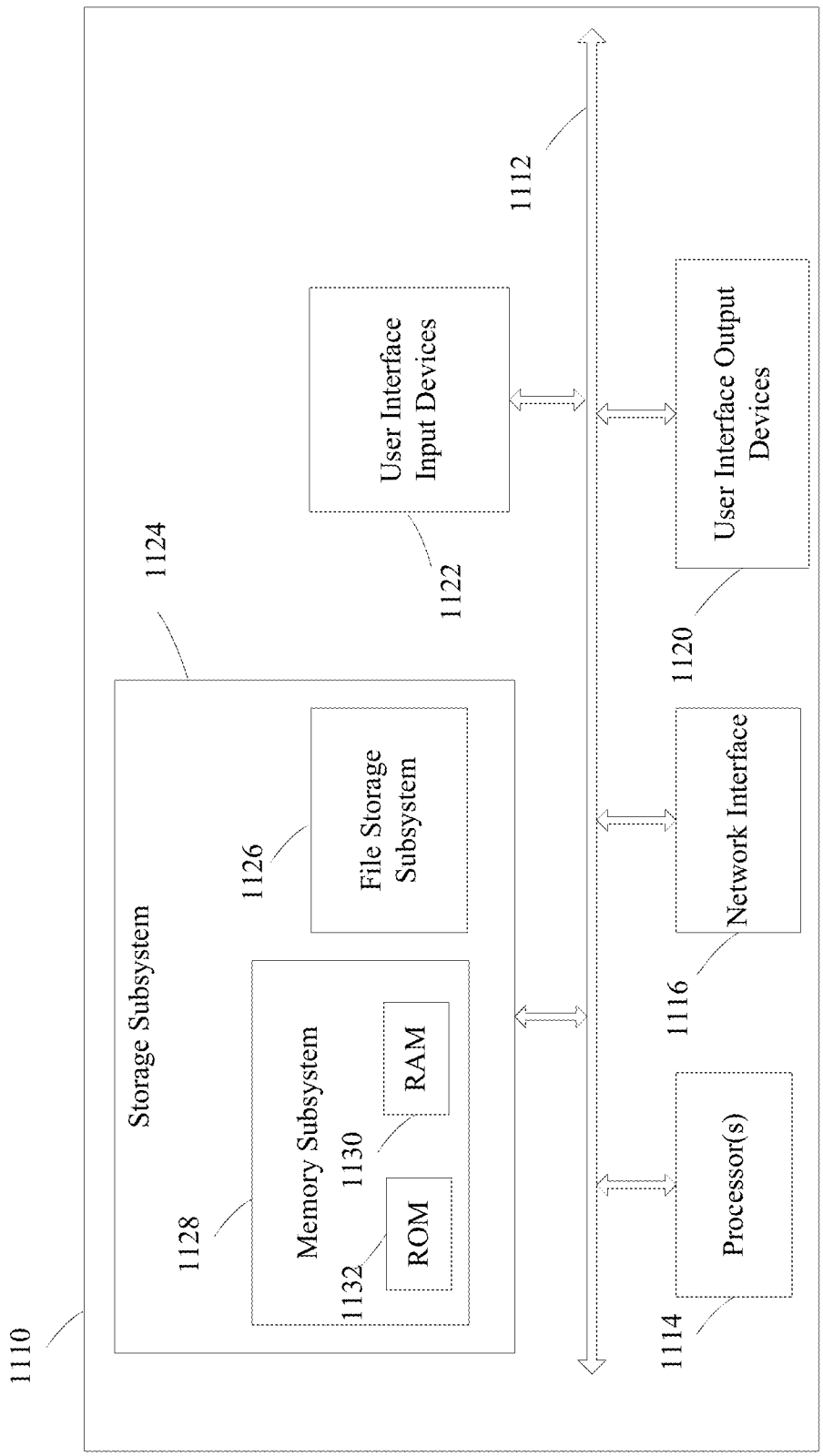
FIG. 11 illustrates a block diagram of an example computer system.

The computing device 105 executes one or more applications and may be, for example, a desktop computer, a laptop computer, a cellular phone, a smartphone, a personal digital assistant (PDA), a tablet computer, a navigation system, a wearable computing device (e.g., glasses, watch, earpiece), or another computing device. The computing device 105 includes memory for storage of data and software applications, a processor for accessing data and executing applications, and components that facilitate communication over the communication network 101. In some implementations, the computing device 105 may include hardware that shares one or more characteristics with the example computer system that is illustrated in FIG. 11.

User interactions with the computing device 105 and/or one or more additional computing devices associated with the user may optionally be utilized to determine past activity indications of the user. For example, one or more past activity indications of a user may be based on one or more documents interacted with by the user via browser 107 and/or other application executable on the computing device 105, such as an e-mail application, a social networking application, a photo viewing application, etc. Documents may include, for example, HTML webpages, XML webpages, e-mails, posts on social media platforms, word processing documents, portable document format ("PDF") documents, images, videos, feed sources, calendar entries, task entries, and so forth. For example, a past activity indication of a user may be based on a webpage document visited by the user via browser 107 and/or other application. Also, for example, a past activity indication of a user may be based on a calendar entry document created in response to input of the user via a calendar application and/or other application. Also, for example, one or more past activity indications of a user may be based on an image, a post, and/or other documents viewed by a user via a social networking application and/or other application. Also, for example, one or more past activity indications of a user may be based on a task entry of a user created in response to a user's interaction with one or more applications. The browser 107 and/or other applications (executing on the computing device 105 or remotely) may optionally provide information related to the documents with permission of the user.

Also, for example, one or more past activity occurrences of a user may be based on one or more search queries issued by the user via browser 107 and/or other application. The browser 107 and/or other applications (executing on the computing device 105 or remotely) may optionally provide information related to the queries with permission of the user. For example, a search system processing queries may provide information related to queries issued by the user. Also, in implementations that provide the user with information related to a subsequent activity indication, the information may be provided to the user via the computing device 105 and/or one or more additional computing devices associated with the user. In some implementations, information related to subsequent activity indications may be provided to one or more applications executable by the computing device 105, such as browser 107.

Content database 120 may include one or more storage mediums and may be utilized to store and/or access one or more aspects of information described herein. For example, content database 120 may be utilized by one or more components to store, modify, and/or access past activity indications 122 and/or transition probabilities for activity indications 124. In some implementations, the content database 120 may store past activity indications 122, and, for each user, access to such data may be allowed only for the user and/or one or more other users or components authorized by the user such as system 130 and/or system 140. In some implementations, each user may have control over whether and/or which past activity indications of the user may be provided for inclusion in past activity indications 122. In some implementations, each user may have the ability to remove past activity indications of the user included in the past activity indications 122.

In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently. In some implementations, one or more of the past activity indications 122 may be represented as a directed graph, with nodes representing an activity data indication and directed edges representing transitions from one node to another node. In some implementations, one or more of the transition probabilities for activity indications may each be represented as a directed and weighted edge between two activity indications, with the direction of the edge representing transition from one node to the other node and the weight of the edge representing the transition probability from the one node to the other node. In this specification, the term "graph" will be used broadly to refer to any mapping of a plurality of associated information items. A graph, or a portion of a graph, need not be present in a single storage device and may include pointers or other indications of information items that may be present on other storage devices. For example, a graph may include multiple nodes mapped to one another, with each node including an identifier of an entity or other information item that may be present in another data structure and/or another storage medium.

Figure 2:
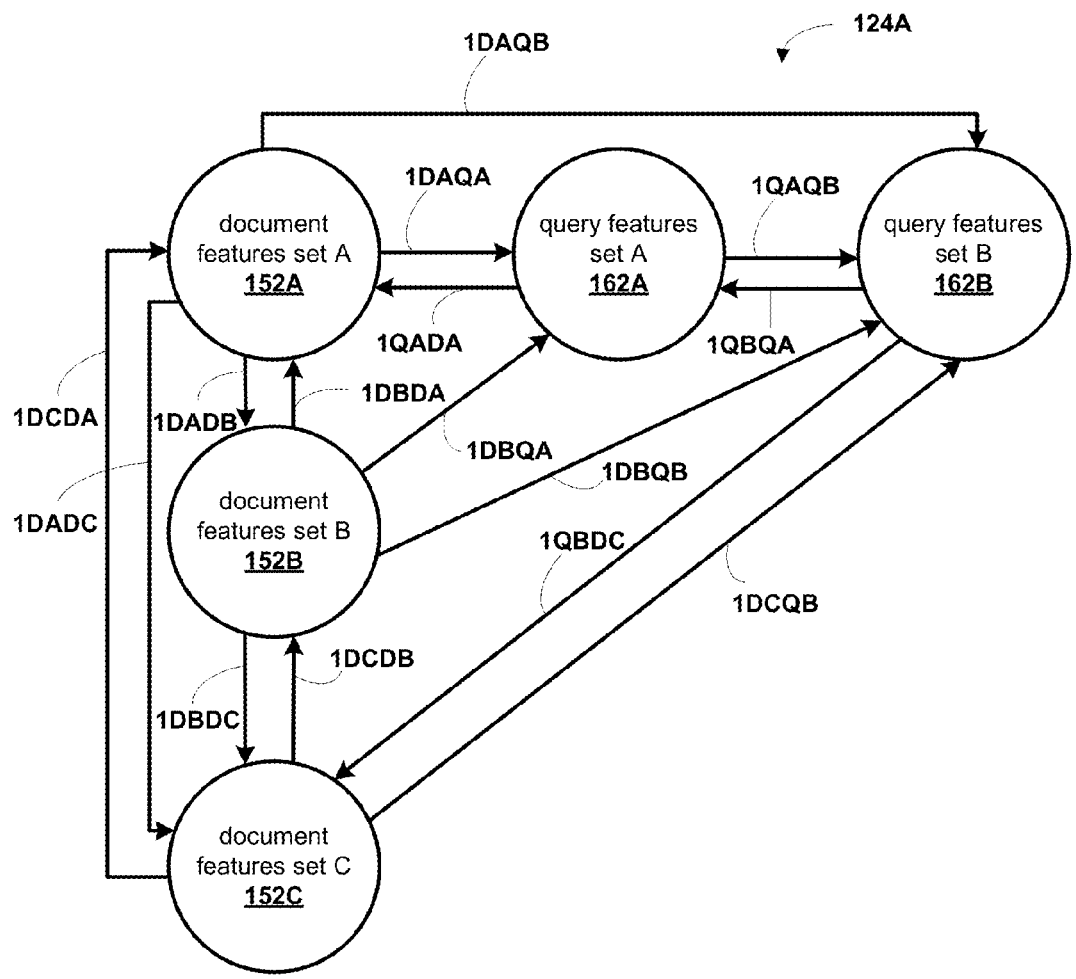
FIG. 2 is a representation of example activity indications and transition probabilities for the activity indications.

With reference to FIG. 2, an example of a portion 124A of transition probabilities for activity indications 124 is provided. The activity indications of portion 124A include document features sets 152A-C and query features sets 162A and 162B that are each represented by a circle indicative of a node. Each of the document features sets 152A-C identify one or more document features that are indicative of a group of documents. For example, document features set 152A may indicate a primary topic of documents such as "General Automotive Forum", document features set 152B may indicate a primary topic of documents such as "Auto Service Business", and document features set 152C may indicate a primary topic of documents such as "Auto Repair". Each of the query features sets 162A and 162B identify one or more query features that are indicative of a group of queries. For example, query features set 162A may indicate a group of queries that include the terms "catalytic converter" and terms that indicate a desire to know the cost of having a catalytic converter installed such as "installation cost", "cost to install", "how much", etc. Also, for example, query features set 162B may indicate a group of queries that include the terms "catalytic converter" and terms that indicate a desire of a user to self-replace the catalytic converter such as "how to install", "instructions to replace", "manual for replacing", etc.

The transition probabilities from activity indications to other activity indications are represented by the directed arrows of FIG. 2 that indicate weighted directed edges between the nodes (features sets 152A-C, 162A, 162B). For example, transition probability 1DAQB indicates the transition probability from document features set 152A to query features set 162B. As described herein, in some implementations a transition probability from a first activity indication to a second activity indication may include multiple transition probabilities, with each transition probability indicating the transition probability for one or more user attributes. Additional discussion of FIG. 2 is provided herein with respect to additional figures.

In some implementations, documents database 150 may include information related to multiple documents. For example, for each of one or more documents, documents database 150 may include an identifier of the document (e.g., a URL or other identifier) and one or more document features associated with the identifier. As described herein, documents database 150 may be utilized by system 130 and/or system 140 to determine one or more document features for one or more documents indicated by past activity indications. In some implementations, queries database 160 may include information related to multiple queries. For example, for each of one or more queries, queries database 160 may include an identifier of the query (e.g., the exact query, a canonicalization of the query, key terms of the query) and one or more query features associated with the identifier. As described herein, queries database 160 may be utilized by system 130 and/or system 140 to determine one or more query features for one or more queries indicated by past activity indications.

Generally, user transition probability determination system 130 identifies a set of one or more activity indications of a user, identifies one or more transition probabilities from the set to a subsequent set of one or more activity indications, and determines a user transition probability from the set to the subsequent set based on the identified transition probabilities. Additional discussion of user transition probability determination system 130 is provided below with respect to FIGS. 3A-8.

Figure 3A:
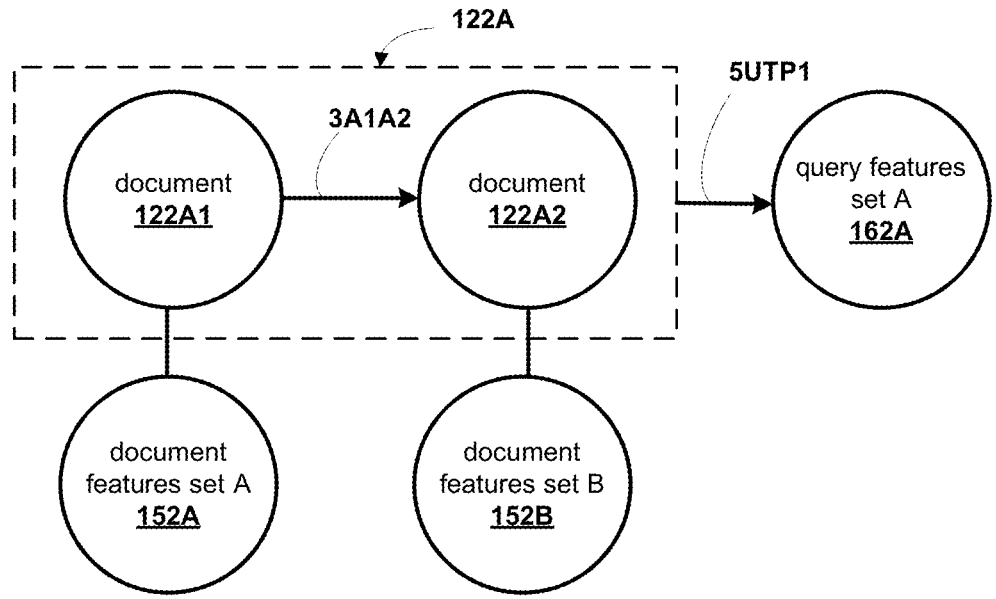
FIG. 3A illustrates an example of a set of document indications of a user, first and second document features sets determined based on the set, and a user transition probability from the set to a subsequent query features set.
Figure 3B:
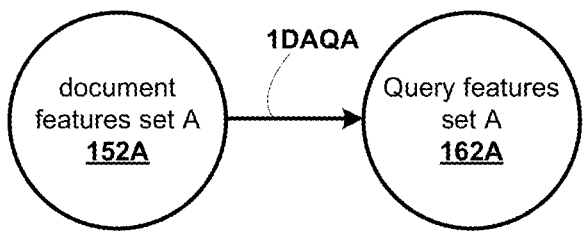
FIG. 3B illustrates an example transition probability from the first document features set of FIG. 3A to the subsequent query features set of FIG. 3A.
Figure 3C:
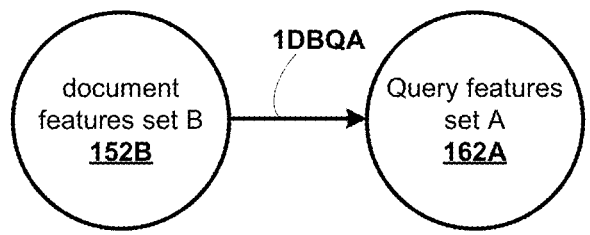
FIG. 3C illustrates an example transition probability from the second document features set of FIG. 3A to the subsequent query features set of FIG. 3A.

With reference to FIG. 3A, an example set of past activity indications 122A of past activity indications 122 is provided. The set of past activity indications 122A includes document 122A1 and document 122A2 that are each represented by a circle indicative of a node. Document 122A2 is a document that was viewed by a user after the user viewed document 122A1. Documents viewed by a user may be determined, directly and/or indirectly, via computing device 105. For example, the browser 107 may provide information related to documents viewed via the browser 107 to content database 120, with permission of the user. Also, for example, a search system may provide information related to documents selected by a user via the computing device 105 in response to a search query.

The documents 122A1 and 122A2 may each include an indication of the document such as a location identifier of the document (e.g., a URL) and/or content of the documents such as metadata and/or a portion of other content of the document. A transition 3A1A2 from document 122A1 to document 122A2 is represented by the directed arrow of FIG. 2 that indicates a directed edge between the nodes (122A1 and 122A2). In some implementations the transition 3A1A2 may indicate a direct transition from document 122A1 to document 122A2 within one or more applications without viewing any other documents between documents 122A1 and 122A2 and/or without submitting any queries between documents 122A1 and 122A2. In some implementations, the transition 3A1A2 may additionally and/or alternatively indicate a transition from document 122A1 to document 122A2 within a given time period such as, for example, 5 minutes. In some implementations document 122A2 may be the document most recently visited, or otherwise interacted with, by the user, such as a document currently being viewed by the user. Additional and/or alternative constraints may be utilized to identify which activity indications to include in a set of activity indication for analysis and/or to identify a transition from document 122A1 to document 122A2.

FIG. 3A also includes document features set 152A with an indicated relationship to document 122A1 and document features set 152B with an indicated relationship to document 122A2. Document features sets 152A is an activity indication indicative of document 122A1 and document features sets 152B is an activity indication indicative of document 122A1. In some implementations, transition probabilities identification engine 132 may determine the document features sets 152A and 152B via documents database 150. For example, documents database 150 may include an identifier of document 122A1 (such as the location identifier indicated by document 122A1 and/or an identifier mapped to the location identifier) and include one or more document features associated with the identifier. One or more of the document features may be selected for the document features set 152A based on, for example, a strength of the association between the document features and the identifier. For example, document 122A1 may be an automotive forum directed toward a certain brand of cars, may be associated with a primary topic of "General Automotive Forum" in documents database 150, and document features set 152A may indicate a topic of "General Automotive Forum". Also, for example, document 122A2 may be a service webpage for an auto dealer, may be associated with a primary topic of "Auto Service Business" in documents database 150, and document features set 152B may indicate a topic of "Auto Service Business".

Transition probabilities identification engine 132 may identify transition probabilities from the document features sets 152A and 152B to one or more subsequent sets of one or more activity indications such as query features set 162A. For example, with reference to FIG. 3B, a transition probability 1DAQA from document features set 152A to query features set 162A is illustrated. The transition probabilities identification engine 132 may determine a directed association from document features set 152A to query features set 162A, and the transition probability 1DAQA based on the portion 124A of transition probabilities of FIG. 2. Likewise, the transition probabilities identification engine 132 may determine a transition probability 1DBQA from the document features set 152B to query features set 162A based on the portion 124A of transition probabilities of FIG. 2.

Continuing with the working example, query features set 162A may, for example, indicate queries that include the terms "catalytic converter" and terms that indicate a desire to know the cost of having a catalytic converter installed such as "installation cost", "cost to install", "how much", etc. In some implementations, the transition probability 1DBQA may be more indicative of transition to query features set 162A than the transition probability 1DAQA, since, for example, users visiting an auto service webpage may have already determined they are taking a car for service and may be more interested in knowing costs, whereas users visiting a general auto forum may still be trying to determine if a car has a problem and/or if the problem warrants service. As described herein, in some implementations past activity data of multiple users may be utilized to determine activity data nodes and transition probabilities between the nodes, such as those illustrated in FIG. 2.

User transition probability calculation engine 134 may determine user transition probabilities from the set of past activity indications 122A to one or more subsequent sets of one or more activity indications based on the transition probabilities determined by transition probabilities identification engine 132. For example, user transition probability calculation engine 134 may determine user transition probability 5UTP1 from the set of past activity indications 122A to the query features set 162A, based on transition probabilities 1DAQA and 1DBQA. For example, user transition probability calculation engine 134 may determine user transition probability 5UTP1 based on a sum, average, and/or other combination of transition probabilities 1DAQA and 1DBQA. In some implementations, transition probability 1DBQA may optionally be weighted more heavily than 1DAQA in determining user transition probability 5UTP1 since document 122A2 (with which document features set 152B is associated) is indicated as interacted with more recently by the user than document 122A1 (with which document features set 152A is associated).

Although only a single determined user transition probability 5UTP1 from the set of past activity indications 122A to query features set 162A is illustrated in FIG. 3A, in some implementations multiple user transition probabilities to multiple subsequent sets of one or more activity indications may be determined. For example, user transition probabilities for all additional subsequent sets that have directed associations from document features sets 152A and/or 152B may be determined. Also, for example, user transition probabilities for additional subsequent sets that have directed associations from document features sets 152A and/or 152B and a transition probability from the document features sets 152A and/or 152B of at least a threshold transition probability may be determined. As one example, a user transition probability to query features set 162B may additionally be determined based on transition probability 1DAQB (FIG. 2) from document features set 152A to query features set 162B. As another example, a user transition probability to document features set 152C may additionally be determined based on transition probability 1DADC (FIG. 2) from document features set 152A to document features set 152C and based on transition probability 1DBDC (FIG. 2) from document features set 152B to document features set 152C. In some implementations, set of past activity indications 122A may be represented as a node in a graph associated with a user, each subsequent activity set may also be represented as a node in the graph, and the user transition probabilities to the subsequent sets may be represented as weighted edges from the set of past activity indications 122A node to respective of the subsequent sets.

Figure 4A:
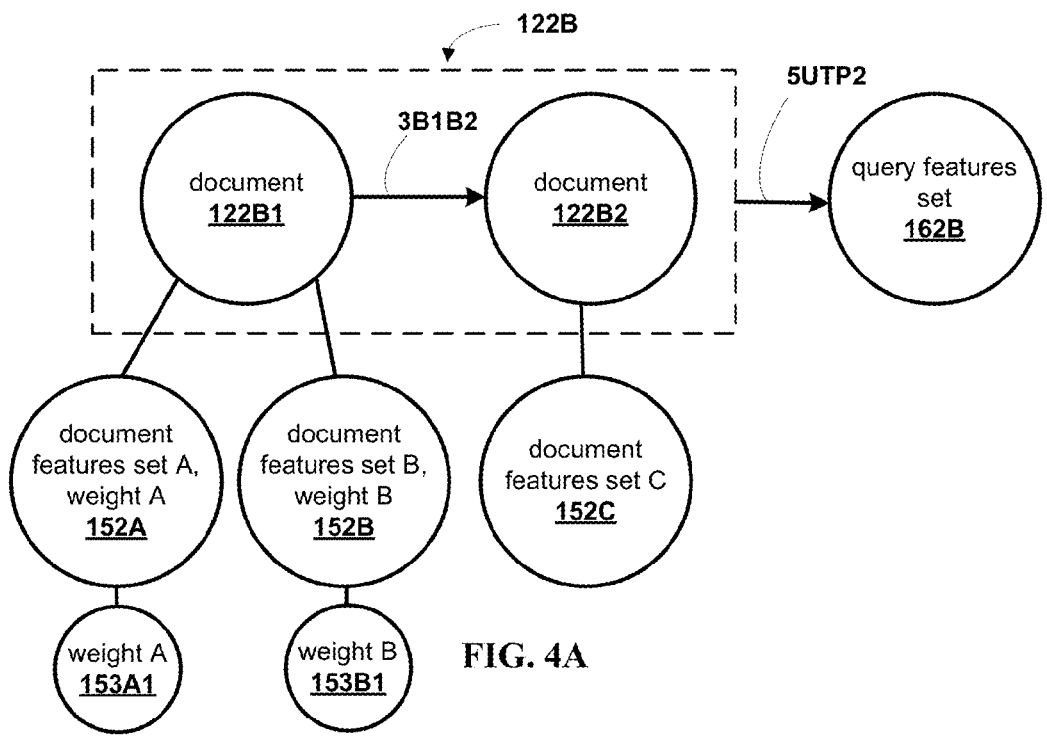
FIG. 4A illustrates an example of a set of document indications of a user, three document features sets determined based on the set, and a user transition probability from the set to a subsequent query features set.
Figure 4B:
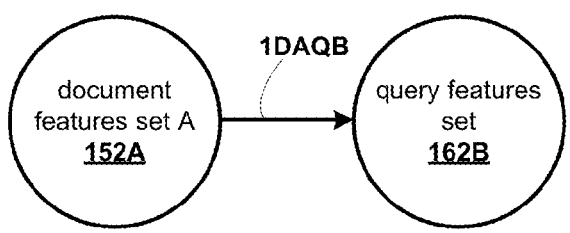
FIG. 4B illustrates an example transition probability from a first document features set of FIG. 4A to the subsequent query features set of FIG. 4A.
Figure 4C:
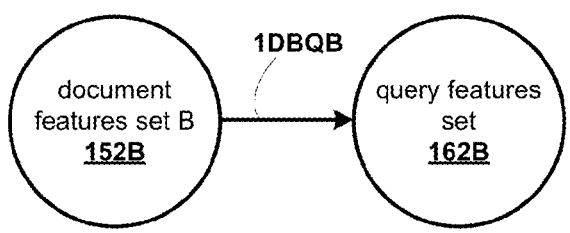
FIG. 4C illustrates an example transition probability from a second document features set of FIG. 4A to the subsequent query features set of FIG. 4A.
Figure 4D:
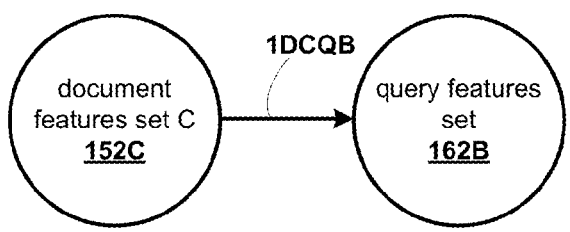
FIG. 4D illustrates an example transition probability from a third document features set of FIG. 4A to the subsequent query features set of FIG. 4A.

With reference to FIG. 4A, another example set of past activity indications 122B of past activity indications 122 is provided. The set of past activity indications 122B may be associated with the same user as the set of past activity indications 122A or may be a set of past activity indications of another user. The set of past activity indications 122B includes document 122B1 and document 122B2 that are each represented by a circle indicative of a node. Document 122B2 is a document that was viewed by a user after the user viewed document 122B1. The documents 122B1 and 122B2 may each include an indication of a document and/or content of the document. A transition 3B1B2 from document 122B1 to document 122B2 is represented by the directed arrow of FIG. 4A that indicates a directed edge between the nodes (122B1 and 122B2). In some implementations, the transition 3B1B2 may indicate a direct transition and/or a transition within a given time period. In some implementations document 122B2 may be the document most recently visited, or otherwise interacted with, by the user. Additional and/or alternative constraints may be utilized to identify which activity indications to include in an activity indication for analysis and/or to identify a transition from document 122B1 to document 122B2.

FIG. 4A also includes document features set 152A with an indicated relationship to document 122B1, document features set 152B with an indicated relationship to document 122B1, and document features set 152C with an indicated relationship to document 122B2. The document features set 152A is associated with a weight 153A1 indicative of the strength of the association of the document features set 152A to the document 122B1. Likewise, the document features set 152B is associated with a weight 153B1 indicative of the strength of the association of the features set 152B to the document 122B1.

In some implementations, transition probabilities identification engine 132 may determine the document features sets 152A and 152B and their respective weights 153A1 and 153B1 via documents database 150. For example, documents database 150 may include an identifier of document 122B1 and include one or more document features associated with the identifier, along with weights for those document features. One or more of the document features may be selected for the document features sets 152A and 152B based on, for example, a strength of the association between the document features and the identifier. For example, document 122B1 may be an automotive forum that is hosted on an auto service business' website and may be associated with topics of "General Automotive Forum" and "Auto Service Business" in documents database 150. Document features set 152A may indicate a topic of "General Automotive Forum" and document features set 152B may indicate a topic of "Auto Service Business". The weights 153A1 and 153B1 may be determined based on the strengths of association of the topics in the documents database 150. For example, weight 153A1 may be greater than weight 153B1 based on a stronger association of the topic of "General Automotive Forum" to the document 122B1.

Also, for example, documents database 150 may include an identifier of document 122B2 and include one or more document features associated with the identifier. For example, document 122B2 may be an auto repair website with step by step instructions on performing various automotive tasks and may be associated with a topic of "Auto Repair" in documents database 150. Features set 152C may indicate a topic of "Auto Repair."

Transition probabilities identification engine 132 may identify transition probabilities from the document features sets 152A, 152B, and 152C to one or more subsequent sets of one or more activity indications such as query features set 162B. For example, with reference to FIG. 4B-4D, a transition probability 1DAQB from document features set 152A to query features set 162B is illustrated; a transition probability 1DBQB from the document features set 152B to query features set 162B is illustrated; and a transition probability 1DCQB from the document features set 152C to query features set 162B is illustrated. The transition probabilities identification engine 132 may determine directed associations from document features sets 152A-C to query features set 162B and determine the transition probabilities based on the portion 124A of transition probabilities of FIG. 2.

Continuing with the working example, query features set 162B may, for example, indicate queries that include the terms "catalytic converter" and terms that indicate a desire of a user to self-replace the catalytic converter such as "how to install", "instructions to replace", "manual for replacing", etc. In some implementations the transition probability 1DCQB may be more indicative of transition to query features set 162B than the transition probabilities 1DAQB and 1DBQB, since, for example, users visiting an auto repair webpage may be more likely to self-repair their auto than those visiting an auto forum and/or an auto service business.

User transition probability calculation engine 134 may determine user transition probabilities from the set of past activity indications 122B to one or more subsequent sets based on the transition probabilities determined by transition probabilities identification engine 132, and based on the weights 153A1 and 153B1. For example, user transition probability calculation engine 134 may determine user transition probability 5UTP2 from the set of past activity indications 122B to the query features set 162B, based on transition probabilities 1DAQA (as influenced by weight 153A1), 1DAQB (as influenced by weight 153B1), and 1DAQC. For example, user transition probability calculation engine 134 may determine user transition probability 5UTP2 based on a combination of the transition probabilities, as weighted. For example, the user transition probability 5UTP2 may be represented as: ½* [((weight 153A1 * 1DAQB)+(weight 153B1*1DBQB))+(1DCQB)]. In some implementations transition probability 1DCQB may optionally be weighted more heavily than the collective contributions of transition probabilities 1DAQB and 1DBQB in determining user transition probability 5UTP2 since document 122B2 is indicated as interacted with more recently by the user than document 122B1.

Although only a single determined user transition probability 5UTP2 from the set of past activity indications 122B to query features set 162B is illustrated in FIG. 4A, in some implementations multiple user transition probabilities to multiple subsequent sets may be determined. For example, user transition probabilities for all additional subsequent sets that have directed associations from document features sets 152A, 152B, and/or 152C may be determined. Also, for example, user transition probabilities for additional subsequent sets that have directed associations from document features sets 152A, 152B, and/or 152C and a transition probability from the document features sets 152A, 152B, and/or 152C of at least a threshold transition probability may be determined. In some implementations set of past activity indications 122B may be represented as a node in a graph associated with a user, each subsequent activity set may also be represented as a node in the graph, and the user transition probabilities to the subsequent sets may be represented as weighted edges from the set of past activity indications 122B node to respective of the subsequent sets.

Figure 5A:
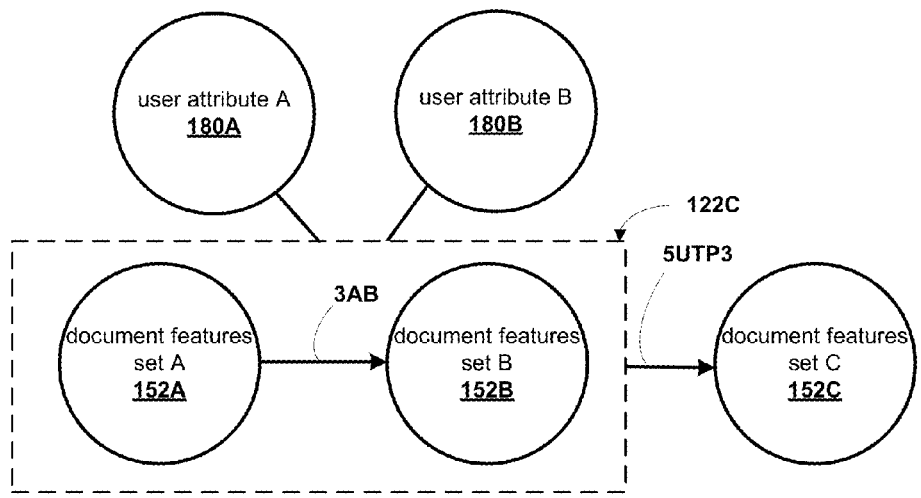
FIG. 5A illustrates an example of a set of document indications of a user, user attributes associated with the set, and a user transition probability from the set to a subsequent document features set.
Figure 5B:
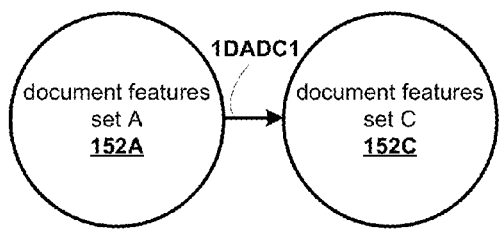
FIGS. 5B-5E each illustrate an example transition probability, for a user attribute of FIG. 5A, from a document features set of FIG. 5A to the subsequent document features set of FIG. 5A.
Figure 5C:
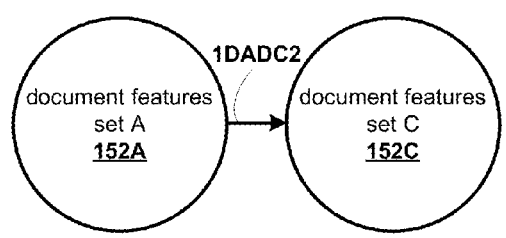
Figure 5D:
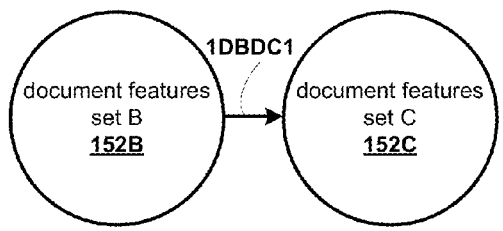
Figure 5E:
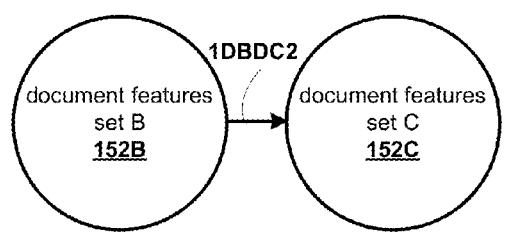

With reference to FIG. 5A, another example set of past activity indications 122C of past activity indications 122 is provided. The set of past activity indications 122C may be associated with the same user as the set of past activity indications 122A and/or the set of past activity indications 122B, or may be a set of past activity indications of another user. The set of past activity indications 122C includes document features set 152A and document features set 152B that are each represented by a circle indicative of a node. In FIG. 5A document features sets are provided as activity indications in lieu of other document identifiers such as a URL and/or content of the documents. The document features sets may be identified, for example, via documents database 150 by computing device 105 and/or other component and stored as activity data indications in lieu of other document identifiers. Document features set 152B is indicative of one or more document features of a document that was viewed by a user after the user viewed a document associated with one or more document features indicated by document features set 152A. A transition 3AB from document features set 152A to document features set 152B is represented by the directed arrow of FIG. 5A that indicates a directed edge between the nodes (152A and 152B). In some implementations, the transition 3AB may indicate a direct transition and/or a transition within a given time period. In some implementations document features set 152B may be indicative of one or more features of the document most recently interacted with by the user. Additional and/or alternative constraints may be utilized to identify which activity indications to include in an activity indication for analysis and/or to identify a transition from document features set 152A to document features set 152B.

FIG. 5A also includes user attribute 180A with an indicated relationship to set of past activity indications 122C and user attribute 180B with an indicated relationship to set of past activity indications 122C. The user attributes 180A and 180B may be user attributes associated with the user with which set of past activity indications 122C is associated. For example, user attribute 180A may be a user attribute of "sports fan" and user attribute 180B may be a user attribute of "vehicle enthusiast". More or fewer user attributes may be identified for a given user. Also, additional and/or alternative user attributes may be utilized besides those examples given herein. For example, a latent user attribute such as "user group A" may be identified that does not identify a particular characteristic such as "sports fan" with which it is associated. Such a latent user attribute of a user may be based on, for example, one or more attributes of a user that are similar to other users of "user group A".

In some implementations, the user attributes 180A and 180B may optionally be associated with a weight that is indicative of the strength of the attribute to the user. In some implementations, the weight of the user attributes 180A and 180B may be utilized to select those user attributes from a group of attributes of the user. For example, user attributes 180A and 180B may be selected based on having a weight of at least a threshold value, such as having a weight that is greater than weights of other attributes. Also, as described below, in some implementations the weights of the user attributes 180A and 180B may optionally be utilized in determining a user transition probability 5UTP3 from set of past activity indications 122C to document features set 152C and/or other subsequent sets of one or more activity indications.

Transition probabilities identification engine 132 may identify, for each of the user attributes 180A and 180B, transition probabilities from the document features sets 152A and 152B to one or more subsequent sets of one or more activity indications such as document features set 152C. For example, with reference to FIG. 5B, a transition probability 1DADC1, for user attribute 180A, from document features set 152A to document features set 152C may be determined. Also, for example, with reference to FIG. 5C, a transition probability 1DADC2, for user attribute 180B, from document features set 152A to document features set 152C may be determined. Likewise, with reference to FIG. 5C, a transition probability 1DBDC1, for user attribute 180A, from document features set 152B to document features set 152C may be determined—and, with reference to FIG. 5C, a transition probability 1DBDC2, for user attribute 180B, from document features set 152B to document features set 152C may be determined.

The transition probabilities 124 may include multiple transition probabilities from a given activity indication to another activity indication, with each transition probability indicating the transition probability for one or more user attributes. For example, multiple transition probabilities may be provided from document features set 152A to document features set 152C, with each transition probability indicative of the transition probability for one or more of multiple user attributes. As described herein, in some implementations a transition probability for a given user attribute may be based on analysis of past activity indications of a plurality of users associated with the given user attribute. As evident from the description herein, in some implementations the multiple transition probabilities from document features set 152A to document features set 152C may include transition probabilities that are distinct from one or more other of the transition probabilities. For example, transition probability 1DADC1 may be distinct from transition probability 1DADC2.

Continuing with the working example, document features set 152C may, for example, indicate a document topic of "Auto Repair." In some implementations, the transition probability 1DADC2 may be more indicative of transition to document features set 152C than transition probability 1DADC1 since, for example, users having an attribute of "vehicle enthusiast" may be more likely to visit a document with an auto repair topic than those users having an attribute of "sports fan". Also, in some implementations, the transition probability 1DBDC2 may be more indicative of transition to document features set 152C than transition probability 1DBDC1 since, for example, users having an attribute of "vehicle enthusiast" may be more likely to visit a document with an auto repair topic than those users having an attribute of "sports fan".

User transition probability calculation engine 134 may determine user transition probabilities from the set of past activity indications 122C to one or more subsequent sets based on the transition probabilities determined by transition probabilities identification engine 132. For example, user transition probability calculation engine 134 may determine user transition probability 5UTP3 from the set of past activity indications 122C to the document features set 152C, based on transition probabilities 1DADC1, 1DADC2, 1DBDC1, and 1DBDC2. For example, user transition probability calculation engine 134 may determine user transition probability 5UTP3 based on a combination of the transition probabilities. For example, the user transition probability 5UTP3 may be represented as: $\frac{1}{4}$* [1DADC1+1DADC2+1DBDC1+1DBDC2]. In some implementations, an optional weight of the user attributes 180A and 180B for the user may be utilized in determining the user transition probability 5UTP3. For example, assume the weight for the user of the user attribute 180A is two times the weight of the user attribute 180B, the user transition probability 5UTP3 may be determined by weighting 1DADC2 and 1DBDC2 more heavily than 1DADC1 and 1DBDC1. In some implementations transition probabilities 1DBDC1 and 1DBDC2 may optionally be collectively weighted more heavily than the transition probabilities 1DADC1 and 1DADC2 in determining user transition probability 5UTP3 since document features set 152B is associated with a document indicated as interacted with more recently by the user than the document indicated by document features set 152A. Although only a single determined user transition probability 5UTP3 from the set of past activity indications 122C to document features set 152C is illustrated in FIG. 5A, in some implementations multiple user transition probabilities to multiple subsequent sets of one or more activity indications may be determined.

Certain examples of user transition probability determination system 130 identifying a set of one or more activity indications of a user, identifying one or more transition probabilities from the set to a subsequent set of one or more activity indications, and determining a user transition probability from the set to the subsequent set based on the identified transition probabilities have been provided in FIGS. 3A-5E. However, techniques utilized by user transition probability determination system 130 are not limited to such examples. For example, although document features of topics are described in some examples related to FIGS. 3A-5E, in some implementations additional and/or alternative document features may be utilized. For instance, in some implementations a document feature of a document may include one or more aspects of a task that are associated with the document in documents database 150 and/or other database. For example, a webpage related to replacing a catalytic converter may be associated with one or more task related document features such as an "automotive repair" task type, a "catalytic converter repair" task, and/or a task step of "remove the old catalytic converter".

Also, for example, although the sets of activity indications 122A-C in FIGS. 3A-5E all include sets of activity indications that are only indicative of documents, in some implementations a set of activity indications may be only indicative of queries and/or may be indicative of one or more queries and one or more documents. Also, for example, although each of the activity indications included in each of the sets of activity indications in FIGS. 3A-5E is only described as indicative of a single document interacted with, in some implementations a single activity indication may be indicative of multiple documents interacted with. Also, for example, although multiple documents are included in each of the sets of activity indications in FIGS. 3A-5E, in some implementations only a single document may be included in a set of activity indications. Also, in some implementations, more documents and/or queries may be indicated in one or more sets of activity indications than the quantity of documents described with respect to FIGS. 3A-5E. Also, for example, in some implementations techniques described with respect to one set of figures may be combined with techniques described with respect to another set of figures.

For example, techniques described with respect to FIGS. 4A-4D may be combined with techniques described with respect to FIGS. 5A-5E.

Figure 6:
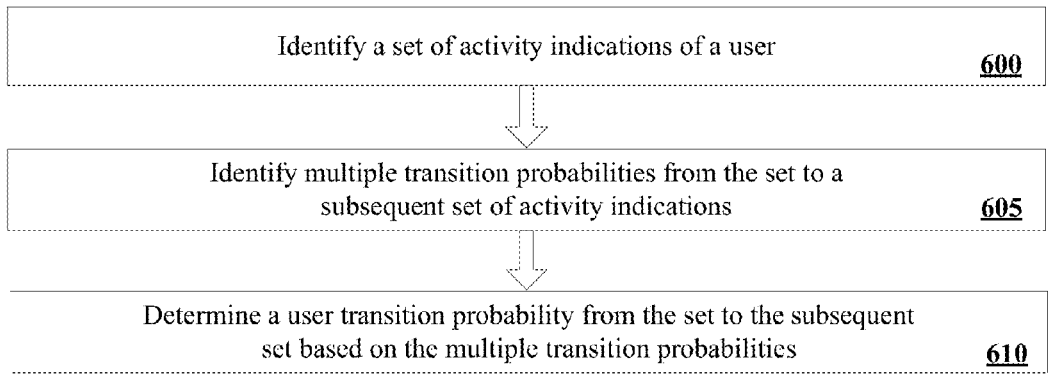
FIG. 6 is a flow chart illustrating an example method of determining a user transition probability based on at least a first transition probability and a second transition probability.

Referring to FIG. 6, a flow chart is illustrated of an example method of determining a user transition probability based on at least a first transition probability and a second transition probability. Other implementations may perform the steps in a different order, omit certain steps, and/or perform different and/or additional steps than those illustrated in FIG. 6. For convenience, aspects of FIG. 6 will be described with reference to one or more components of FIG. 1 that may perform the method such as the user transition probability determination system 130.

At step 600, a set of one or more activity indications of a user is identified. In some implementations, the set of activity indications are identified from computing device 105 and/or content database 120 (e.g., one or more entries of past activity indications 122) by a component that shares one or more characteristics with user transition probability determination system 130. The activity indications of the set are each indicative of one or more queries and/or one or more documents. The activity indications each include certain information related to one or more documents interacted with and/or issued queries such as an identifier of the documents/queries, content of the documents/queries, and/or features of the documents/queries.

When the set of activity indications includes multiple activity indications, the set may include information that identifies the transitions between the activity indications. For example, the activity indications may each be represented as a node and directed edges between the nodes may indicate the transitions between the activity indications. In some implementations a transition from a first activity indication to a second activity indication may indicate a direct transition within one or more applications without viewing any other documents and/or without submitting any other queries between the first and second activity indications. In some implementations, the transition may additionally and/or alternatively indicate a transition within a given time period such as, for example, 5 minutes. In some implementations, the activity indication indicated as the most recent activity indication by the transitions may be the most recent activity indication, such as a document currently being viewed by the user. Additional and/or alternative constraints may be utilized to identify which activity indications to include in a set of activity indications for analysis and/or to identify a transition from a given activity indication to another activity indication.

At step 605, multiple transition probabilities from the set of step 600 to a subsequent set of one or more activity indications are identified. In some implementations, transition probabilities identification engine 132 may identify the transition probabilities from a mapping of activity indications and transition probabilities, such as the transition probabilities for activity indications 124 of content database 120. The transition probabilities identification engine 132 may determine one or more directed associations from one or more of the activity indications of the set of step 605 to the subsequent set, and determine multiple transition probabilities to the set from the one or more activity indications. In some implementations, two or more transition probabilities are determined from the set of step 605 to each of multiple subsequent sets of one or more activity indications.

In some implementations, one of the multiple transition probabilities is based on a first activity indication of the set of step 605 and another of the transition probabilities is based on a second activity indication of the set of step 605.

In some implementations, one of the multiple transition probabilities is based on a first document feature associated with a given activity indication of the set of step 605 and another of the transition probabilities is based on a second document feature associated with the given activity indication of the set of step 605. In some implementations, one of the multiple transition probabilities is based on a first user attribute associated with the set of step 605 and another of the transition probabilities is based on a second user attribute associated with the set of step 605.

At step 610, a user transition probability from the set to the subsequent set is determined based on the multiple transition probabilities of step 605. In some implementations, the user transition probability calculation engine 134 may determine the user transition probability. For example, user transition probability calculation engine 134 may determine the user transition probability based on a sum, average, and/or other combination of the transition probabilities of step 605. In some implementations, transition probabilities of step 605 that are associated with activity indications that have occurred more recent in time may be weighted more heavily in determining the user transition probability than those associated with activity indications that have occurred less recent in time. In some implementations, optional weights associated with one or more of the multiple transition probabilities of step 605 may be utilized in determining the user transition probability.

Although only a single determined transition probability from the set of past activity indications of step 600 to a subsequent set of activity indications is illustrated in FIG. 6, in some implementations multiple user transition probabilities to multiple subsequent sets of one or more activity indications may be determined. In some implementations, the set of past activity indications of step 605 may be represented as a node in a graph associated with a user, each subsequent set of activity indications may also be represented as a node in the graph, and the user transition probabilities to the subsequent sets may be represented as weighted edges from the set of past activity indications node to respective of the subsequent sets.

Information presented to the user may be selected and/or ranked based on the one or more user transition probabilities to the one or more subsequent set of activity indications. For example, a subsequent query and/or document that is identified as related to one or more of the subsequent sets (e.g., based on relationships in documents database 150 and/or queries database 160) may be ranked based on the user transition probability to the subsequent sets with which it is related. As one example, a subsequent set may include document features related to one or more documents. A given document of the one or more documents may be identified as responsive to a new search query submitted by the user and the given document may be ranked for the new search query based on the user transition probability. For example, the ranking of the document may be increased if the transition probability is indicative of a strong likelihood of transition.

As another example, the subsequent set may include query features related to one or more queries. A given query of the one or more queries may be identified and selected for presentation to the user based on the user transition probability. For example, the given query may be identified as one of multiple candidate query suggestions for a partial query entered by the user and the given query may be selected from the candidate query suggestions based at least in part on the user transition probability. Also, for example, if the user transition probability satisfies a threshold indicative of strong likelihood of transition, the given query may be provided to the user as a suggested query suggestion independent of partial query input from the user and independent of complete query input from the user. For example, the given query may be provided as a suggestion the next time the user navigates to a search webpage and/or selects a search widget (without providing any input in the search field). Also, for example, the given query may be surfaced as a suggestion via a suggestion card or otherwise.

In some implementations, information may be provided to the user after the user has interacted with an additional document or issued an additional query, wherein the additional document and the additional query are independent of the activity indications indicated by the set of activity indications utilized to determine the user transition probability. For example, the transition probability may be utilized to rank a search result responsive to a search query, wherein the transition probability is not based on the search query itself.

Figure 7:
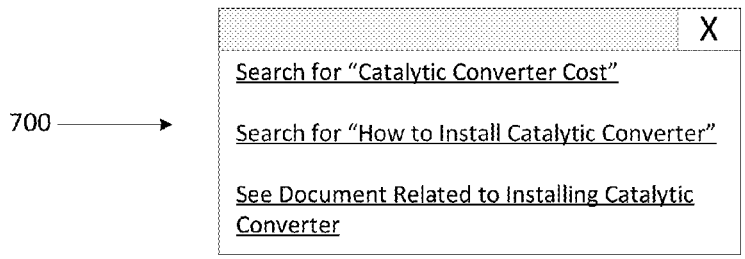
FIG. 7 is an example of information associated with a subsequent set of activity indications that may be provided to a user based on a user transition probability to the subsequent set.

FIG. 7 illustrates one example of information associated with a subsequent activity set that may be provided to a user based on a user transition probability to the subsequent activity set. FIG. 7 presents a display 700 that may be, for example a suggestion card surfaced to a user. The display includes suggestions to "Search for 'Catalytic Converter Cost'", "Search for 'How to Install Catyltic Converter"; and "See Steps for Installing Catlytic Converter". The suggested search queries may be identified, for example, based on being search queries included in one or more subsequent activity sets and/or being the most highly ranked search queries in one or more subsequent activity sets. The suggested document may be identified, for example, based on being a document included in one or more subsequent activity sets and/or being the most highly ranked document in one or more subsequent activity sets.

Figure 8:
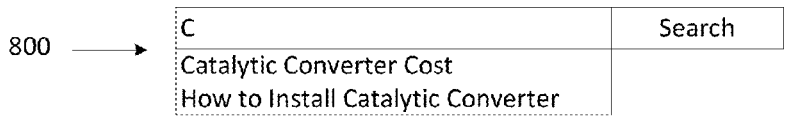
FIG. 8 is an example of query suggestions associated with a subsequent set of activity indications that may be provided to a user and selected and/or ranked based on a user transition probability to the subsequent set.

FIG. 8 is an example of query suggestions associated with a subsequent activity set that may be provided to a user and selected and/or ranked based on a user transition probability to the subsequent activity set. In the display 800 a partial query input of "C" has been entered. Query suggestions of "Catalytic Converter Cost" and "How to Install Catalytic Converter" have been provided responsive to the partial query input. In some implementations, the provided query suggestions of FIG. 8 may be identified as a candidate query suggestions for the partial query entered by the user based on traditional and/or other techniques. The provide query suggestions of FIG. 8 may be selected from the candidate query suggestion based at least in part on the user transition probability.

Generally, activity indications transition probabilities determination system 140 identifies activity indications of multiple users, determines a preceding group of the activity indications, determines a subsequent group of the activity indications that are associated with, and occur subsequent to, one or more activity indications of the preceding group, and determines a transition probability from the preceding group to the subsequent group. The transition probability may be utilized to identify a transition probability from a set of activity indications related to the preceding group to a subsequent set of activity indications related to the subsequent group. For example, the transition probability may be utilized by the user transition probability determination system 130 as described herein.

Additional discussion of activity indications transition probabilities determination system 140 is provided below with respect to FIGS. 2 and 9-10. In some implementations, activity indications transition probabilities determination system 140 may be utilized to determine the portion 124A of and/or the remainder of transition probabilities for activity indications 124. In some implementations, other techniques and/or systems may be utilized to determine the portion 124A (FIG. 2), the remainder of transition probabilities for activity indications 124 (FIG. 1), and/or other transition probabilities utilized by the user transition probability determination system 130.

Figures 9, 10:
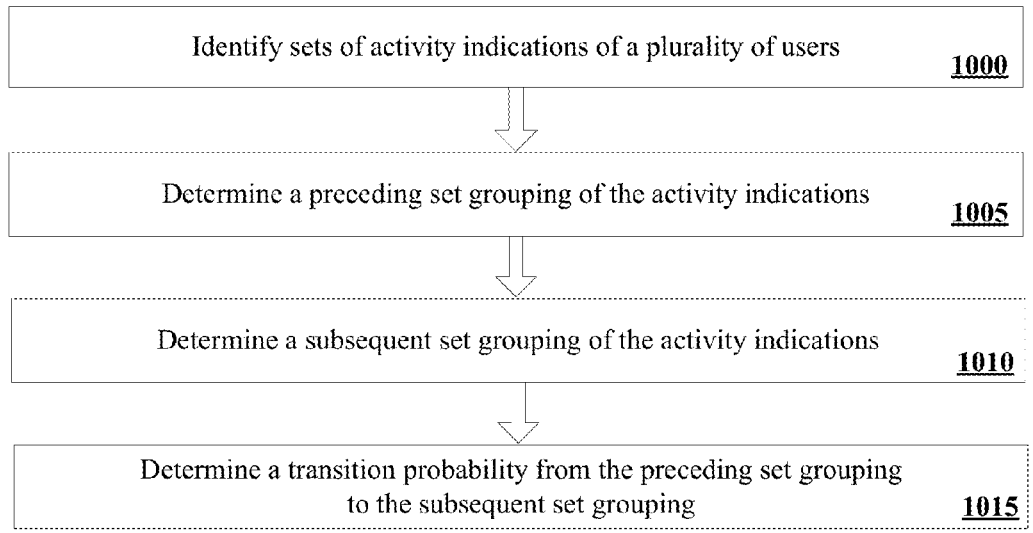
FIG. 9 is a representation of example sets of activity indications of a plurality of users and feature sets determined based on sets of activity indications.
FIG. 10 is a flow chart illustrating an example method of determining a transition probability from a preceding group to a subsequent group.

FIG. 9 is a representation of example sets of activity indications 122A-G of a plurality of users and of features sets 123A-G determined based on the sets of activity indications 122A-G. Only a small number of sets of activity indications 122A-G and feature sets 123A-G are illustrated in FIG. 9 for sake of brevity. However, as described below, larger numbers of sets of activity indications and/or features sets may be utilized by system 140 to determine a transition probability from a preceding group to a subsequent group.

The sets of activity indications 122A-G of FIG. 9 may be identified from one or more databases. For example, the sets may be identified from past activity indications 122 of content database 120. Activity indications may be determined, for example, based on a record of documents interacted with and/or submitted queries with timestamps or other temporal information. The record may be based on, for example, information provided by computing devices of users, with permission of the users.

Each set of the sets of activity indications 122A-G represents activity indications from a user of the multiple users. For example, set of activity indications 122A may represent activity indications of a first user and set of activity indications 122B may represent activity indications of a second user. Each of the activity indications of the sets of activity indications 122A-G of FIG. 9 are each indicative of a submitted query or document interacted with and include one or more directed associations to and/or from one or more other of the identified activity indications. The activity indications each include certain information related to one or more documents interacted with and/or issued queries such as an identifier of the documents/queries, content of the documents/queries, and/or features of the documents/queries. The directed association(s) for each activity indication in FIG. 9 are represented by the order of the activity indication in a respective set of activity indications 122A-G. For example, document indication D2 in set of activity indications 122A is indicated as being interacted with after document D1 and before document D3. In some implementations, the activity indications of the sets may be represented as nodes and the transitions between the sets may be represented as directed edges between the nodes.

In some implementations, a transition from a first activity indication to a second activity indication, in one of the sets 122A-G may indicate a direct transition within one or more applications without viewing any other documents and/or without submitting any other queries between the first and second activity indication. In some implementations, the transition may additionally and/or alternatively indicate a transition within a given time period such as, for example, 5 minutes. In some implementations, the number of activity indications in a given set may be constrained to a maximum number of activity indications. For example, each set of activity indications may be constrained to less than 10 activity indications, optionally in combination with a given time period constraint. In situations in which activity indications indicate 10 or more activity indications within a given time period, the activity indications may optionally be split into multiple sets of activity indications. Additional and/or alternative constraints may be utilized to identify which activity indications to include in a set of activity indications for analysis and/or to identify a transition from a given activity indication to another activity indication.

Each of the sets of activity indications 122A-G is associated with a respective features set of the features sets 123A-G. For example, set of activity indications 122A is associated with a features set 123A. The features set 123A may be determined based on features associated with the activity indications of sets of activity indications 122A. For example, document features set 152A may be one or more features associated with document D1, document features set 152B may be one or more features associated with document D1, and document features set 152C may be one or more features associated with document D3. Also, for example, query features set 162B may be one or more features associated with query Q1 and query features set 162A may be one or more features associated with query Q2. In some implementations the features set 123A may be determined based on the documents database 150 and the queries database 160. For example, documents database 150 may include an identifier of document D1 and include one or more document features associated with the identifier such as document features of document features set 152A. One or more of the document features may be selected for the document D1 based on, for example, a strength of the association between the document features and the identifier.

Features of documents may include, for example, one or more topics associated with the documents, one or more entities associated with the documents, one or more task features associated with the documents, and/or one or more document groups to which the documents belong. Features of queries may include, for example, one or more terms of the queries, one or more entities associated with the queries, and/or one or more task features associated with the queries. Although each activity indication of FIG. 9 is only illustrated as associated with a single features set in FIG. 9, in some implementations multiple features sets may be determined for an activity indication. For example, in some implementations document topics may be determined for each of the document indications and documents may be grouped based on the document topics. Document tasks may also be determined for each of one or more of the document indications and documents may also be grouped based on the documents tasks.

Grouping engine 142 of system 140 may determine a preceding group of the activity indications of sets of activity indications 122A-G (and additional unillustrated sets) based on similarity between the activity indications of the preceding group. For example, a preceding group of the activity indications having a document features set of 152A may be determined that includes: activity indication D1 from set 122A, activity indication D10 from set 122B, activity indication D1 from set 122C, activity indication D1 from set 122D, activity indication D1 from set 122E, activity indication D1 from set 122G, and optionally additional indications from additional unillustrated sets of activity indications.

Grouping engine 142 may also determine a subsequent group of the activity indications of sets of activity indications 122A-G (and additional unillustrated sets) based on similarity between the activity indications of the subsequent group. Grouping engine 142 may determine activity indications for inclusion in the subsequent group based on the activity indications of the subsequent group being indicated by a respective directed association as associated with and occurring subsequent to one or more of the activity indications of the preceding group. For example, a subsequent group of the activity indications having a query features set of 162A may be determined that includes: activity indication Q2 from set 122A, activity indication Q3 from set 122B, activity indication Q2 from set 122C, activity indication Q2 from set 122D, and activity indication Q2 from set 122E, and optionally additional indications from additional unillustrated sets of activity indications.

Each of the activity indications of the subsequent group is indicated by a respective directed association as associated with and occurring subsequent to one or more of the activity indications of the preceding group. For example, Q2 is indicated as occurring subsequent to document D1 in set 122A, with documents D2 and D3 and query Q1 interceding. In some implementations, grouping engine 142 may only determine a given activity indication occurs subsequent to a preceding activity indication if less than a threshold number of interceding activity indications occur between the given activity indication and the preceding activity indication. For example, in some implementations grouping engine 142 may only determine a given activity indication occurs subsequent to a preceding activity indication if less than five interceding activity indications occur between the given activity indication and the preceding activity indication. Inclusion of subsequent activity indications that do not occur immediately after a preceding activity indication (e.g., with interceding activity indication(s)) factors indirect associations between preceding activity indications and subsequent activity indications into a determined transition probability described below.

Grouping transition probability engine 144 of system 140 may determine a transition probability from the preceding group to the subsequent group. In some implementations, the grouping transition probability engine 144 may determine the transition probability based on a count of the activity indications in at least one of the preceding group and the subsequent group. For example, continuing with the previous example and assuming set of activity indications 122A-G are the only activity indications analyzed, the count of activity indications associated with the preceding group is six and the count of activity indications associated with the subsequent group is five. In some implementations, the transition probability may be based on comparison of the count of activity indications associated with the preceding group and the count of activity indications associated with the subsequent group. For example, the transition probability may be determined to be and/or based on 0.833 (5/6). Basing the transition probability at least in part on comparison of the count of activity indications associated with the preceding group and the count of activity indications associated with the subsequent group may generally take into account how many of the occurrences of activity indications in the preceding group lead to an activity indication in the subsequent group.

In some implementations, the transition probability is additionally and/or alternatively determined based on a count of the activity indications in the subsequent group, as compared to a second count of activity indications of a larger corpus. For example, the larger corpus may include a second subsequent group of the activity indications, wherein each of the activity indications of the second subsequent group is excluded from the subsequent group but includes one or more similarities with the subsequent group.

For example, the second subsequent group may include all of the query indications associated with query features set 162A that are not part of the subsequent group (i.e., are not indicated by a directed association as occurring subsequent to a document associated with document features set 152A).

For example, query features set 162A may be associated with a query that occurs after a document associated with document features set 152A in 50 activity indications in sets 122A-G and additional unillustrated sets. Query features set 162A may further be associated with queries that do not occur after a document associated with document features set 152A in 1000 activity indications in sets 122A-G and additional unillustrated sets. The transition probability may be based on comparison of the count of activity indications in the subsequent group (50), as compared to the second count of occurrences of the queries that are associated with query features set 162A, but do not occur after a document associated with document features set 152A (1000). For example, the transition probability may be determined to be and/or based on 0.05 (50/1000) and/or 0.048 (50/1050). Basing the transition probability at least in part on comparison of the count of the activity indications in the subsequent group, as compared to a second count of the activity indications of a larger corpus may generally take into account whether a given subsequent group of activity indications is popular with respect to a given preceding group, instead of just being popular overall. For example, such a comparison may take into account the overall popularity of features of a determined subsequent group.

In some implementations, occurrences of subsequent activity indications that do not occur immediately after a preceding activity indication (e.g., with interceding activity indication(s)) may be weighted less heavily in a determined transition probability than those that occur immediately after a preceding activity indication. In some implementations, the greater the number of interceding activity indications between a subsequent activity indication and a preceding activity indication, the less the weighting of the subsequent activity indication will be in a determined transition probability. For example, a subsequent activity indication with three interceding activity indications may be weighted less heavily than a subsequent activity indication with only one interceding activity indication. Additional and/or alternative techniques for determining a transition probability may be utilized, including those that optionally take into account a count of the activity indications in at least one of the preceding group and the subsequent group.

In some implementations, the grouping transition probability engine 144 may associate the determined transition probability with transition from the document features set 152A to the query features set 162A. For example, the grouping transition probability may utilize the determined transition probability as the transition probability 1DAQA of FIG. 2.

The activity indications transition probabilities determination system 140 may generally repeat the same and/or similar process for each of a plurality of identified preceding groups and associated subsequent groups. For example, grouping engine 142 may determine a preceding group of the activity indications having a query features set of 162B that includes: activity indication Q1 from set 122A, activity indication Q1 from set 122B, and activity indication Q10 from set 122F. Grouping engine 142 of system 140 may also determine a subsequent group of the activity indications based on similarity between the activity indications of the subsequent group and based on the activity indications of the subsequent group being indicated by a respective directed association as associated with and occurring subsequent to one or more of the activity indications of the preceding group. For example, a subsequent group of the activity indications having a document features set of 152C may be determined that includes: activity indications D10 and D5 from set 122F, and optionally additional indications from additional unillustrated sets of activity indications Each of the activity indications of the subsequent group is indicated by a respective directed association as associated with and occurring subsequent to one or more of the activity indications of the preceding group. For example, D10 is indicated as occurring directly subsequent to query Q10 in set 122F, whereas document D5 is indicated as occurring subsequent to query Q10, with document D10 interceding. In some implementations document D5 may have been navigated to from document D5 without going back to a search page provided in response to query Q10. In some implementations, the set 122F may be based at least in part on navigation data provided by an application of a computing device such as browser 107 of computing device 105. Inclusion of subsequent activity indications that do not occur immediately after a preceding activity indication (e.g., with interceding activity indication(s)) factors indirect associations between preceding activity indications and subsequent activity indications into a determined transition probability.

Grouping transition probability engine 144 may determine a transition probability from the preceding group to the subsequent group. In some implementations, the grouping transition probability engine 144 may associate the determined transition probability with transition from the query features set 162B to the document features set 152C. For example, the grouping transition probability may utilize the determined transition probability as the transition probability 1QBDC of FIG. 2.

The activity indications transition probabilities determination system 140 may generally repeat the same and/or similar process for each of a plurality of identified preceding groups and associated subsequent groups to determine the additional transition probabilities 1DAQB, 1QAQB, 1QADA, 1QBQA, 1DBQB, 1DCDA, 1DADB1, 1DBDA1, 1DBQA1, 1DADC, 1DCQB, 1DBDC, and 1DCDB of FIG. 2. As evident from description herein, a given activity indication may be included in one or more preceding groups and in one or more subsequent groups. In some implementations, only those transition probabilities having at least a threshold transition probability may be stored in transition probabilities for activity indications 124.

In some implementations, grouping engine 142 may select only document or only queries for one or both of the preceding group and the subsequent group. In some other implementations, grouping engine 142 may include both documents and queries in a given group. For example, documents and queries may both be provided in a preceding group based on association of the document and queries to one or more shared features such as shared topics, entities, and/or tasks.

In some implementations, grouping engine 142 may select only the activity indications associated with one or more user attributes for a preceding group and associated subsequent group. For example, in some implementations one or more of the set of activity indications 122A-G and additional unillustrated sets may each be associated with one or more user attributes. A transition probability from a preceding group to a subsequent group for one or more user attributes may be determined by selecting only the activity indications associated with the one or more user attributes for a preceding group and associated subsequent group. In some implementations an optional weight associated with the user attributes may be utilized to select activity indications that are sufficiently associated with the user attribute (e.g., having at least a threshold weight) and/or in determining the transition probability for the user attribute (e.g., weighting based on the weight of the user attribute). Accordingly, multiple transition probabilities may be determined from a preceding group to a subsequent group, with each of the transition probabilities being associated with one or more user attributes.

In some implementations, grouping engine 142 may determine additional query and/or document features sets than those illustrated in FIG. 2 and determine additional preceding and subsequent groups, and transition probabilities, based on such additional features sets. For example, in some implementations a first set of document features sets may be based on topics associated with documents, a second set of document features sets may be based on tasks, task types, and/or task steps associated with documents, and a third set of document features sets may be based on topics associated with documents and entities associated with documents. In some implementations, one or more of the documents and/or queries may optionally be associated with multiple features sets. For example, document D1 may be associated with document features set 152A that indicates a topic of the document and additionally associated with an additional features set that indicates a task associated with the document.

Referring to FIG. 10, a flow chart is illustrated of an example method of determining a transition probability from a preceding group to a subsequent group. Other implementations may perform the steps in a different order, omit certain steps, and/or perform different and/or additional steps than those illustrated in FIG. 10. For convenience, aspects of FIG. 10 will be described with reference to one or more components of FIG. 1 that may perform the method such as the user transition probability determination system 130.

At step 1000, sets of activity indications of a plurality of users are identified. In some implementations, the sets of activity indications are identified from computing devices of multiple users and/or content database 120 (e.g., multiple entries of past activity indications 122) by a component that shares one or more characteristics with activity indications transition probabilities determination system 140. The activity indications of each of the sets are each indicative of one or more submitted queries and/or one or more documents interacted with. The activity indications each include certain information related to one or more documents interacted with and/or issued queries such as an identifier of the documents/queries, content of the documents/queries, and/or features of the documents/queries. Each set may include information that identifies the transitions between the activity indications of the set. For example, the activity indications may each be represented as a node and directed edges between the nodes may indicate the transitions between the activity indications.

At step 1005, a preceding group of the activity indications of the sets of step 1000 is identified. In some implementations grouping engine 142 of system 140 may determine a preceding group of the activity indications of the sets of activity indications based on similarity between the activity indications of the preceding group. For example, a preceding group of the activity indications may be determined based on one or more features shared by the activity indications of the group.

At step 1010, a subsequent group of the activity indications of the sets of step 1000 is identified. In some implementations, grouping engine 142 determines a subsequent group of the activity indications of the sets of activity indications based on similarity between the activity indications of the subsequent group. Grouping engine 142 may determine activity indications for inclusion in the subsequent group based on the activity indications of the subsequent group being indicated by a respective directed association as associated with and occurring subsequent to one or more of the activity indications of the preceding group. For example, a subsequent group of the activity indications may be determined based on one or more features shared by the activity indications of the subsequent group and based on the activity indications of the subsequent group being indicated by a respective directed association as associated with and occurring subsequent to one or more of the activity indications of the preceding group.

In some implementations, grouping engine 142 may determine a given activity indication that occurs subsequent to an activity indication of the preceding group, with one or more interceding activity indications. In some implementations, grouping engine 142 may only determine a given activity indication occurs subsequent to a preceding activity indication if less than a threshold number of interceding activity indications occur between the given activity indication and the preceding activity indication. Inclusion of subsequent activity indications that do not occur immediately after a preceding activity indication (e.g., with interceding activity indication(s)) factors indirect associations between preceding activity indications and subsequent activity indications into a determined transition probability described below.

At step 1015, a transition probability from the preceding group to the subsequent group is determined. In some implementations, grouping transition probability engine 144 of system 140 may determine the transition probability from the preceding group to the subsequent group. In some implementations, the grouping transition probability engine 144 may determine the transition probability based on a count of the activity indications in at least one of the preceding group and the subsequent group.

In some implementations, the transition probability may be based on comparison of the count of activity indications associated with the preceding group and the count of activity indications associated with the subsequent group. Basing the transition probability at least in part on comparison of the count of activity indications associated with the preceding group and the count of activity indications associated with the subsequent group may generally take into account how many of the occurrences of activity indications in the preceding group lead to an activity indication in the subsequent group. In some implementations, the transition probability is additionally and/or alternatively determined based on the count of the activity indications in the subsequent group, as compared to a second count of activity indications of a larger corpus that is related to the subsequent group. Basing the transition probability at least in part on comparison of the count of the activity indications in the subsequent group, as compared to a second count of the activity indications of a larger corpus may generally take into account whether a given subsequent group of activity indications is popular with respect to a given preceding group, instead of just being popular overall.

Although only a single determined transition probability from a preceding group to a subsequent group of activity indications is illustrated in FIG. 10, multiple transition probabilities from a given preceding group to a given subsequent group may be determined, additional transition probabilities from the given preceding group to additional subsequent groups may be determined, and/or additional transition probabilities from additional preceding groups to additional subsequent groups may be determined. For example, the example method of FIG. 10 may be repeated for additional preceding groups, subsequent groups, and/or based on other constraints (e.g., user attributes).

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

The system 130, the system 140, and/or one or more additional components of the example environment of FIG. 1 may each include memory for storage of data and software applications, a processor for accessing data and executing applications, and components that facilitate communication over a network. In some implementations, the system 130 and the system 140 may include hardware that shares one or more characteristics with the example computer system that is illustrated in FIG. 11. The operations performed by one or more components of the example environment may optionally be distributed across multiple computer systems. For example, the steps performed by system 130 may be performed via one or more computer programs running on one or more servers in one or more locations that are coupled to each other through a network.

FIG. 11 is a block diagram of an example computer system 1110. Computer system 1110 typically includes at least one processor 1114 which communicates with a number of peripheral devices via bus subsystem 1112. These peripheral devices may include a storage subsystem 1124, including, for example, a memory subsystem 1126 and a file storage subsystem 1128, user interface input devices 1122, user interface output devices 1120, and a network interface subsystem 1116. The input and output devices allow user interaction with computer system 1110. Network interface subsystem 1116 provides an interface to outside networks and is coupled to corresponding interface devices in other computer systems.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1110 to the user or to another machine or computer system.

Storage subsystem 1124 stores programming and data constructs that provide the functionality of some or all of the modules described herein. For example, the storage subsystem 1124 may include the logic to perform one or more of the steps of FIG. 6 and/or FIG. 10.

These software modules are generally executed by processor 1114 alone or in combination with other processors. Memory 1126 used in the storage subsystem can include a number of memories including a main random access memory (RAM) 1130 for storage of instructions and data during program execution and a read only memory (ROM) 1132 in which fixed instructions are stored. A file storage subsystem 1128 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1128 in the storage subsystem 1124, or in other machines accessible by the processor(s) 1114.

Bus subsystem 1112 provides a mechanism for letting the various components and subsystems of computer system 1110 communicate with each other as intended. Although bus subsystem 1112 is shown schematically as a single bus, alternative implementations of the bus subsystem may use multiple busses.

Computer system 1110 can be of varying types including a workstation, server, computing cluster, blade server, server farm, or any other data processing system or computing device. Due to the ever-changing nature of computers and networks, the description of computer system 1110 depicted in FIG. 11 is intended only as a specific example for purposes of illustrating some implementations. Many other configurations of computer system 1110 are possible having more or fewer components than the computer system depicted in FIG. 11.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
   identifying a first attribute for the user and a first weight of the first attribute for the user, the first weight indicative of strength of the first attribute to the user;

identifying a second attribute for the user and a second weight of the second attribute for the user, the second weight indicative of strength of the second attribute to the user;

identifying a set of document indications of a user, the identified set of document indications indicative of multiple documents having been interacted with by the user within a time period constraint;

identifying, from a database of transition probabilities:
- a first transition probability from the set of document indications to a subsequent set of activity indications, wherein the first transition probability is identified based on it being associated, in the database, with the first attribute for the user, and
- a second transition probability from the same set of document indications to the same subsequent set, wherein the second transition probability is identified based on it being associated, in the database, with the second attribute for the user,
- wherein the subsequent set is indicative of at least one of: at least one subsequent query or at least one subsequent document;

determining a user transition probability from the set of document indications to the subsequent set, the determining the user transition probability based on a combination of:
- a first weighted transition probability that is based on the first transition probability and the first weight of the first attribute for the user, and
- a second weighted transition probability that is based on the second transition probability and the second weight of the second attribute of the user;

determining an additional transition probability from the set of document indications to an additional subsequent set of activity indications, the additional subsequent set being different from the subsequent set and being indicative of at least one of: at least one additional subsequent query or at least one additional subsequent document;

ranking, based on the user transition probability and the additional user transition probability, the at least one subsequent query or the at least one subsequent document relative to the at least one additional subsequent query or the at least one additional subsequent document and providing, based on the ranking and for presentation to a user via a computing device of the user, information related to the at least one subsequent query or the at least one subsequent document.

2. The method of claim 1, wherein the set of document indications identifies a first document of the documents indicated as interacted with by the user, and wherein identifying the first transition probability includes:
determining a document features set of the document and identifying the first transition probability based on a directed association from the document features set to the subsequent set.

3. The method of claim 2, wherein the set of document indications identifies a second document of the documents indicated as interacted with by the user subsequent to the first document, and wherein identifying the second transition probability includes:
determining a second document features set of the second document and identifying the second transition probability based on a second directed association from the second document features set to the subsequent set.

4. The method of claim 1, wherein the set of document indications identifies a first document features set indicative of a first document of the documents interacted with by the user and a second document features set indicative of a second document of the documents interacted with by the user, and wherein the first transition probability is identified based on the first document features set and the second transition probability is identified based on the second document features set.

5. The method of claim 1, wherein the subsequent set is indicative of a given document of the at least one subsequent document and wherein the additional subsequent set is indicative of an additional given document of the at least one additional subsequent document, and further comprising:
identifying the given document and the additional given document as responsive to a new query submitted by the user;
wherein ranking the at least one subsequent query or the at least one subsequent document relative to the at least one additional subsequent query or the at least one additional subsequent document comprises:
ranking the given document relative to the additional given document for the new query based on the user transition probability and the additional user transition probability.

6. The method of claim 1, wherein the subsequent set is indicative of a given query of the at least one subsequent query and further comprising:
selecting the given query for presentation to the user based on the user transition probability;
wherein the given query is included in the provided information related to the at least one subsequent query or the at least one subsequent document.

7. The method of claim 6, wherein selecting the given query for presentation to the user based on the user transition probability includes selecting the given query independent of partial query input from the user and independent of complete query input from the user.

8. The method of claim 1, further comprising:
selecting the information, the selecting based on the user transition probability; and
providing the user with the information after the user has interacted with an additional document or issued an additional query, the additional document and the additional query independent of the documents indicated by the set of document indications of the user.

9. A computer implemented method, comprising:
identifying, from one or more databases, activity indications of a plurality of users, each of the identified activity indications identifying at least one submitted query or at least one document interacted with and including at least one directed association to one or more other of the identified activity indications;
determining a preceding group of the activity indications, the determining the preceding group based on similarity between the activity indications of the preceding group;
determining a subsequent group of the activity indications, the determining the subsequent group based on similarity between the activity indications of the subsequent group;
wherein each of the activity indications of the subsequent group is indicated by a respective said directed association as associated with, occurring subsequent to, and within a threshold time period of one or more of the activity indications of the preceding group;

wherein determining the subsequent group of the activity indications includes:
  selecting one or more direct activity indications and one or more indirect activity indications for inclusion in the activity indications of the subsequent group, wherein a given indirect activity indication of the indirect activity indications is indicated as associated with and occurring subsequent to one of the activity indications of the preceding group and associated with and occurring subsequent to one or more intervening activity indications that are not members of the preceding group, and
  wherein each of the one or more direct activity indications is indicated, by a corresponding one of the directed associations, as occurring immediately after a corresponding one of the activity indications of the preceding group; and
determining a transition probability from the preceding group to the subsequent group, wherein determining the transition probability includes weighting the indirect activity indications of the subsequent group less heavily than the direct activity indications of the subsequent group;
subsequent to determining the transition probability:
  determining that a user has submitted one or more queries and/or accessed one or more documents conforming to the preceding group and, in response: proactively providing, based on the transition probability from the preceding group to the subsequent group, information pertaining to the subsequent group for presentation via a computing device of the user.

10. The method of claim 9, wherein the determining the preceding group based on similarity between the activity indications of the preceding group includes selecting only the activity indications that identify a document for the preceding group; and wherein the determining the subsequent group based on similarity between the activity indications of the subsequent group includes selecting only the activity indications that identify a query for the subsequent group.

11. The method of claim 9, wherein multiple documents are identified by the activity indications of the preceding group and multiple queries are identified by the activity indications of the subsequent group.

12. The method of claim 11, wherein the determining the subsequent group based on similarity between the activity indications of the subsequent group includes determining the activity indications of the subsequent group are each associated with one or more shared query features.

13. The method of claim 12, wherein the determining the preceding group based on similarity between the activity indications of the preceding group includes determining the activity indications of the preceding group are each associated with one or more shared document features.

14. The method of claim 13, further comprising associating the transition probability with transition from a shared document features set indicating the shared document features to a shared query features set indicating the shared query features.

15. The method of claim 14, wherein the shared document features include a document topic.

16. The method of claim 14, wherein the shared document features include at least one of a task, task type, and task step.

17. The method of claim 9, wherein determining the transition probability is based on a count of the activity indications in at least one of the preceding group and the subsequent group.

18. The method of claim 9, wherein determining the transition probability is based on comparing a count of the activity indications in the subsequent group to a second count of the activity indications of a larger corpus, wherein the larger corpus includes a second subsequent group of the activity indications, wherein each of the activity indications of the second subsequent group is excluded from the subsequent group.

19. The method of claim 18, wherein the larger corpus is restricted to the second subsequent group.

20. The method of claim 18, wherein the larger corpus includes the second subsequent group and the subsequent group.

21. The method of claim 9, wherein the determining the preceding group based on similarity between the activity indications of the preceding group includes selecting only the activity indications associated with a first user attribute for the preceding group; and wherein the determining the subsequent group based on similarity between the activity indications of the subsequent group includes selecting only the activity indications associated with the first user attribute for the subsequent group.

22. The method of claim 21, further comprising associating the transition probability with the first user attribute.

23. A system including memory and one or more processors operable to execute instructions in memory, comprising instructions to:
  identify a first attribute for the user and a first weight of the first attribute for the user, the first weight indicative of strength of the first attribute to the user;
  identify a second attribute for the user and a second weight of the second attribute for the user, the second weight indicative of strength of the second attribute to the user;
  identify a set of document indications of a user, the identified set of document indications indicative of multiple documents having been interacted with by the user within a time period constraint;
  identify, from a database of transition probabilities:
    a first transition probability from the set of document indications to a subsequent set of activity indications, wherein the first transition probability is identified based on it being associated, in the database, with the first attribute for the user, and
    a second transition probability from the same set of document indications to the same subsequent set, wherein the second transition probability is identified based on it being associated, in the database, with the second attribute for the user,
    wherein the subsequent set is indicative of at least one of: at least one subsequent query or at least one subsequent document; and
  determine a user transition probability from the set of document indications to the subsequent set, the determining the user transition probability based on a combination of:
    a first weighted transition probability that is based on the first transition probability and the first weight of the first attribute for the user, and
    a second weighted transition probability that is based on the second transition probability and the second weight of the second attribute of the user;

determine an additional transition probability from the set of document indications to an additional subsequent set of activity indications, the additional subsequent set being different from the subsequent set and being indicative of at least one of: at least one additional subsequent query or at least one additional subsequent document; and rank, based on the user transition probability and the additional user transition probability, the at least one subsequent query or the at least one subsequent document relative to the at least one additional subsequent query or the at least one additional subsequent document; and provide, based on the ranking and for presentation to a user via a computing device of the user, information related to the at least one subsequent query or the at least one subsequent document.

\* \* \* \* \*